US012649408B1

(12) United States Patent
Chen

(10) Patent No.: US 12,649,408 B1
(45) Date of Patent: Jun. 9, 2026

(54) INTEGRATED BRAKE STRUCTURE AND TENSIONER

(71) Applicant: Zhangjiagang City Xiangle Tool Co., Ltd., Suzhou (CN)

(72) Inventor: Zhilong Chen, Suzhou (CN)

(73) Assignee: Zhangjiagang City Xiangle Tool Co., Ltd., Suzhou (CN)

( * ) Notice: Subject to any disclaimer, the term of this patent is extended or adjusted under 35 U.S.C. 154(b) by 0 days.

(21) Appl. No.: 19/409,743

(22) Filed: Dec. 5, 2025

(30) Foreign Application Priority Data

Nov. 17, 2025 (CN) .......................... 202522432255.1
Nov. 24, 2025 (WO) ................ PCT/CN2025/137002

(51) Int. Cl.
B60P 7/08 (2006.01)
F16D 63/00 (2006.01)
F16D 121/14 (2012.01)

(52) U.S. Cl.
CPC ............ B60P 7/083 (2013.01); F16D 63/006 (2013.01); F16D 2121/14 (2013.01)

(58) Field of Classification Search
CPC ....... B60P 7/083; B60P 7/0846; B60P 7/0853; B60P 3/079; B60P 7/0823; B60P 7/0838; F16D 2121/14; Y10T 24/2175; Y10T 24/21; Y10T 24/4773; Y10T 74/20744; Y10T 24/2117; Y10T 24/2113

USPC ......................................................... 410/100
See application file for complete search history.

(56) References Cited

U.S. PATENT DOCUMENTS 12,318,894 B1 * 6/2025 Jin .......................... B25B 25/00

FOREIGN PATENT DOCUMENTS

CN 1843653 A * 10/2006 .............. B60P 7/083

* cited by examiner

*Primary Examiner* — Amy R Weisberg
*Assistant Examiner* — Philip C Adams

(57) ABSTRACT

The present application relates to the technical field of tensioners, and discloses an integrated brake structure and a tensioner. The brake structure includes a housing, a ratchet wheel, a handle holder, and a brake pad assembly. The handle holder is movably arranged on the housing and has a locked position and an unlocked position during movement. The brake pad assembly includes a first brake pad, a second brake pad, and an elastic member. The present application reduces production and assembly costs by integrating the brake pad assembly with the handle holder into one unit. By driving the handle holder to move with an external force, locking and unlocking functions are achieved: in the locked position, securing of goods is ensured; and in the unlocked position, the risk of sudden loss of control and rebound of the first bandage is avoided and operational safety is improved.

17 Claims, 11 Drawing Sheets

INTEGRATED BRAKE STRUCTURE AND TENSIONER

CROSS REFERENCE TO RELATED APPLICATIONS

The present application claims the benefit of Chinese Patent Application No. 2025224322551 filed on Nov. 17, 2025 and claims the benefit of PCT Application No. PCT/CN2025/137002 filed on Nov. 24, 2025, the contents of which are incorporated herein by reference in their entirety.

TECHNICAL FIELD

The present application relates to the technical field of tensioners, and in particular, to an integrated brake structure and a tensioner.

BACKGROUND

A tensioner is a key tool for securing goods during transportation, movement, shipping, or storage. The tensioner prevents goods from falling off by a locking function, has the characteristics of safety, reliability, lightweight and easy operation, and protects object surfaces from damage. The tensioner is also an indispensable tensioning device for reinforcing steel formwork and compressed wooden boards.

At present, a common tensioner on the market typically includes a housing, a ratchet wheel, and a split brake system arranged on the housing. The split brake system mainly includes a brake component, an operating handle, and a transmission component, which are mounted separately on the housing in a split form. During a working process, the handle needs to be driven with an external force, and then the action is transmitted to the brake component via the transmission component, so as to achieve braking or unlocking of the ratchet wheel. However, such a split structure has obvious shortcomings: first, the overall structure is complex, with a large number of parts, resulting in cumbersome assembly processes and high production costs; second, multiple operation steps and a long transmission path are likely to cause safety hazards due to misoperation in practical use, making it difficult to ensure reliability; and furthermore, the existing split brake structure typically only has a single brake acting point, i.e., transmit and bear braking force via only one part, resulting in local stress concentration at the point, insufficient overall structural strength, and plastic deformation or early damage during use, which seriously affects the service life of a tensioner.

SUMMARY

To solve at least one aspect of the aforementioned problems, the present application provides an integrated brake structure, which includes a housing, a ratchet wheel, a handle holder, and a brake pad assembly. The ratchet wheel is rotatably arranged on the housing. A first bandage is wrapped around the ratchet wheel. The handle holder is movably arranged on the housing and has a locked position and an unlocked position during movement. The brake pad assembly includes a first brake pad, a second brake pad, and an elastic member. The first brake pad is connected to the handle holder, and the second brake pad is connected to the first brake pad. When the handle holder is driven to the locked position with an external force, the elastic member drives the first brake pad to abut against and lock the ratchet wheel to restrict the first bandage from being pulled out by the external force. When the handle holder is driven to the unlocked position with the external force, the elastic member drives the second brake pad to abut against the ratchet wheel and position the ratchet wheel in a semi-locked state, at which moment the first bandage can be pulled out by the external force.

Optionally, the ratchet wheel is provided with a plurality of convex teeth along a circumferential direction thereof. A positioning groove is formed between two adjacent convex teeth. The first brake pad is provided with a positioning block movably engaged with the positioning groove. The second brake pad is provided with an abutting block movably abutted against the convex tooth. When the handle holder is in the locked position, the elastic member drives the positioning block to engage with the positioning groove to lock the ratchet wheel. When the handle holder is in the unlocked position, the positioning block disengages from the positioning groove, and the elastic member drives the abutting block to abut against the convex tooth to position the ratchet wheel in the semi-locked state.

Optionally, the housing is provided with a stop block. Two sides of the stop block are provided with a first stop part and a second stop part respectively. When the handle holder is in the locked position, the positioning block abuts against the first stop part for limiting the position. When the handle holder is in the unlocked position, the positioning block abuts against the second stop part for limiting the position.

Optionally, the handle holder is rotatably connected to the housing. The first brake pad is rotatably connected to the handle holder. The first brake pad is provided with a mounting block. A mounting groove for rotatably mounting the mounting block is formed in the housing. The mounting groove includes two symmetrically formed fan-shaped grooves for limiting a rotation angle of the mounting block.

Optionally, the second brake pad is provided with mounting bars, and the first brake pad is provided with insertion grooves for inserting the corresponding mounting bars.

Optionally, the first brake pad is provided with a pressing handle. The second brake pad is pressed against one side of the first brake pad away from the ratchet wheel. The elastic member is a torsion spring. Two legs of the torsion spring abut against the handle holder and the first brake pad respectively.

Optionally, the torsion spring is provided with a limiting protrusion in a bending manner. The first brake pad is provided with a first limiting groove corresponding to the limiting protrusion. The second brake pad is provided with a second limiting groove corresponding to the limiting protrusion. The limiting protrusion is clamped in the first limiting groove and the second limiting groove simultaneously for limiting the position.

Optionally, the housing is provided with a second bandage. One end of the first bandage is provided with a first buckling ring. One end of the second bandage is provided with a second buckling ring. The housing is provided with a coil spring. The ratchet wheel is driven by an elastic force of the coil spring to rotate forward to draw back the first bandage.

Optionally, the housing is provided with a baffle plate in a movable manner. A compression spring is arranged between the baffle plate and the housing. The handle holder is provided with a pushing part. When the handle holder is in the locked position, the compression spring drives the baffle plate to abut against and lock the ratchet wheel. When the handle holder is driven to move from the locked position to the unlocked position with an external force, the handle holder pushes the baffle plate via the pushing part to disengage from the ratchet.

Compared to the prior art, the integrated brake structure of the present application simplifies the structure and reduces production and assembly costs by integrating the brake pad assembly with the handle holder into one unit. By driving the handle holder to move with an external force, locking and unlocking functions are achieved: in the locked position, the first bandage can be firmly restricted from drawing back, thereby ensuring securing of goods; and in the unlocked position, the ratchet wheel can be in a semi-locked state, to allow the first bandage to be pulled out in a controllable manner, thereby avoiding the risk of sudden loss of control and rebound of the first bandage and improving operational safety. When the handle holder is in the locked position, the positioning block and the positioning groove are engaged to serve as a first force bearing point, and the baffle plate abuts against and locks the ratchet wheel under the action of the compression spring to serve as a second force bearing point, thus forming a two-point supported force bearing system. A concentrated stress borne by a single component is effectively dispersed to two different structures, thereby reducing a load borne by each point, alleviating fatigue and wear of the components, improving the durability of key components such as the first brake pad and the baffle plate, preventing deformation or early damage of the key components, enhancing the overall reliability of the tensioner under heavy load and high-frequency use, and prolonging the service life of a product.

In addition, the present application further provides a tensioner, which includes the aforementioned integrated brake structure. The tensioner also has the beneficial effects of the aforementioned integrated brake structure, and descriptions thereof will not be repeated herein.

Figure 1:
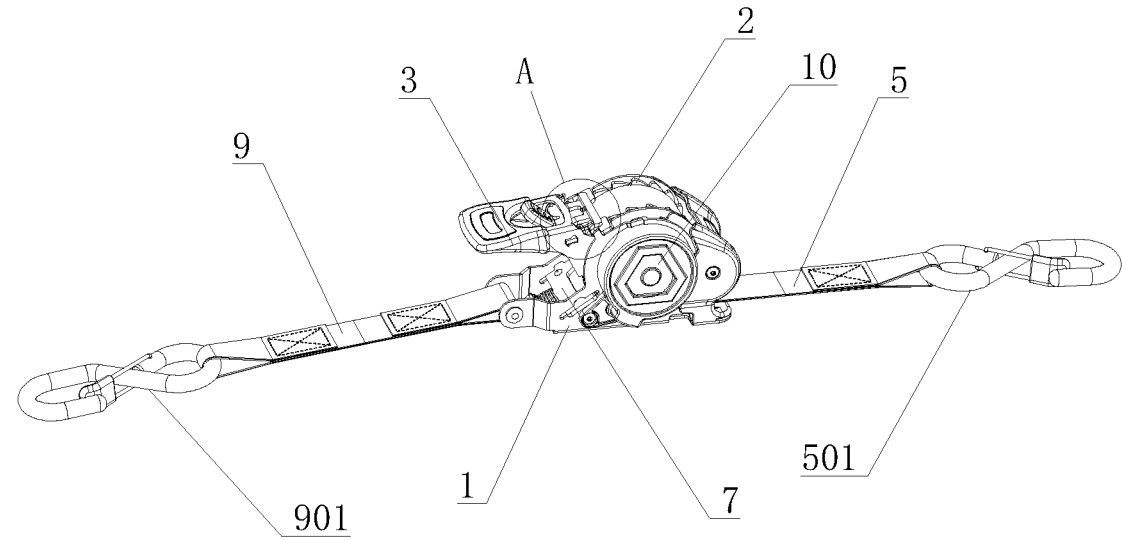
FIG. 1 is a three-dimensional diagram of a handle holder in a locked position of an integrated brake structure of the present application.

Names of components corresponding to the reference numerals in the figures: 1. Housing, 101. Stop block, 1011. First stop part, 1012. Second stop part, 102. Mounting groove, 2. Ratchet wheel, 201. Convex tooth, 202. Positioning groove, 3. Handle holder, 301. Pushing part, 4. Coil spring, 5. First bandage, 501. First buckling ring, 61. First brake pad, 611. Positioning block, 612. Mounting block, 613. Insertion groove, 614. Pressing handle, 615. First limiting groove, 62. Second brake pad, 621. Abutting block, 622. Mounting bar, 623. Second limiting groove, 63. Elastic member, 631. Limiting protrusion, 7. Baffle plate, 8. Compression spring, 9. Second bandage, and 901. Second buckling ring.

DETAILED DESCRIPTION

To make the foregoing objectives, features, and advantages of the present application more apparent and easier to understand, specific embodiments of the present application will be described in detail below with reference to the accompanying drawings.

In the descriptions of the present application, it should be understood that the terms such as "upper" and "lower" indicate orientations or positional relationships based on the orientations or positional relationships of products during normal use.

The terms such as "first" and "second" are used merely for the purpose of description, and shall not be construed as indicating or implying relative importance or implying the number of technical features indicated. Therefore, the features defined by "first" and "second" may explicitly indicate or implicitly include at least one of such features.

Referring to FIG. 1 to FIG. 11, embodiments of the present application provide an integrated brake structure, which includes a housing 1, a ratchet wheel 2, a handle holder 3, and a brake pad assembly. The ratchet wheel 2 is rotatably arranged on the housing 1. A first bandage 5 is wrapped around the ratchet wheel 2. The handle holder 3 is movably arranged on the housing 1 and has a locked position and an unlocked position during movement. The brake pad assembly includes a first brake pad 61, a second brake pad 62, and an elastic member 63. The first brake pad 61 is connected to the handle holder 3, and the second brake pad 62 is connected to the first brake pad 61. When the handle holder 3 is driven to the locked position with an external force, the elastic member 63 drives the first brake pad 61 to abut against and lock the ratchet wheel 2 to restrict the first bandage 5 from being pulled out by the external force. When the handle holder 3 is driven to the unlocked position with the external force, the elastic member 63 drives the second brake pad 62 to abut against the ratchet wheel 2 and position the ratchet wheel 2 in a semi-locked state, at which moment the first bandage 5 can be pulled out by the external force. The present application simplifies the structure and reduces production and assembly costs by integrating the brake pad assembly with the handle holder 3 into one unit. By driving the handle holder 3 to move with an external force, locking and unlocking functions are achieved: in the locked position, the first bandage 5 can be firmly restricted from drawing back, thereby ensuring securing of goods; and in the unlocked position, the ratchet wheel 2 can be in a semi-locked state, to allow the first bandage 5 to be pulled out in a controllable manner, thereby avoiding the risk of sudden loss of control and rebound of the first bandage 5 and improving operational safety. After the first bandage 5 is pulled out for a certain length and released, the second brake pad 62 re-position the ratchet wheel 2 in the semi-locked state under the action of the elastic member 63.

Specifically, the brake pad assembly and the handle holder 3 are integrated into one unit. During assembly, only the brake pad assembly needs to be assembled onto the handle holder 3, and then the handle holder 3 assembled with the brake pad assembly is assembled onto the housing 1, so the structure is compact. The brake pad assembly can be directly driven to move together via the handle holder 3, so that the handle holder 3 drives the brake pad assembly without the need for an additional transmission component, thereby reducing the possibility of misoperation, simplifying the structure, reducing the number of parts, saving materials, achieving quicker assembly, and reducing the production and assembly costs. When the ratchet wheel 2 is in the semi-locked state, the first bandage 5 is pulled out with an external force. At this moment, the external force overcomes a resistance from the elastic member 63 acting on the ratchet wheel 2 via the second brake pad 62, so that the ratchet wheel 2 can rotate under the action of the external force, and further the first bandage 5 can be pulled out.

Referring to FIG. 3, FIG. 4, FIG. 10, and FIG. 11, the ratchet wheel 2 is provided with a plurality of convex teeth 201 along a circumferential direction thereof. A positioning groove 202 is formed between two adjacent convex teeth 201. The first brake pad 61 is provided with a positioning block 611 movably engaged with the positioning groove 202. The second brake pad 62 is provided with an abutting block 621 movably abutted against the convex tooth 201. When the handle holder 3 is in the locked state, the elastic member 63 drives the positioning block 611 to engage with the positioning groove 202 to lock the ratchet wheel 2. When the handle holder 3 is in the unlocked position, the positioning block 611 disengages from the positioning groove 202, and the elastic member 63 drives the abutting block 621 to abut against the convex tooth 201 to position the ratchet wheel 2 in the semi-locked state. When the handle holder 3 is in the locked position, the positioning block 611 and the positioning groove 202 are rigidly engaged, so that the ratchet wheel 2 cannot rotate after the engagement, thus the first bandage 5 cannot be pulled out when being secured, and the first bandage 5 is ensured to be in a tightened state to achieve reliability in use. When the handle holder 3 is in the unlocked position, the abutting block 621 on the second brake pad 62 elastically abuts against the convex tooth 201 of the ratchet wheel 2 to form the semi-locked state, so that the ratchet wheel 2 can be positioned in the current position when the first bandage 5 is not pulled out with an external force, thereby preventing the first bandage 5 from quickly drawing back or rebounding, facilitating an operator to bind or perform other operations on the first bandage 5, and improving the operational safety. Also, the first bandage 5 is allowed to be further pulled out to a required length with an external force to meet different requirements of binding.

Figure 2:
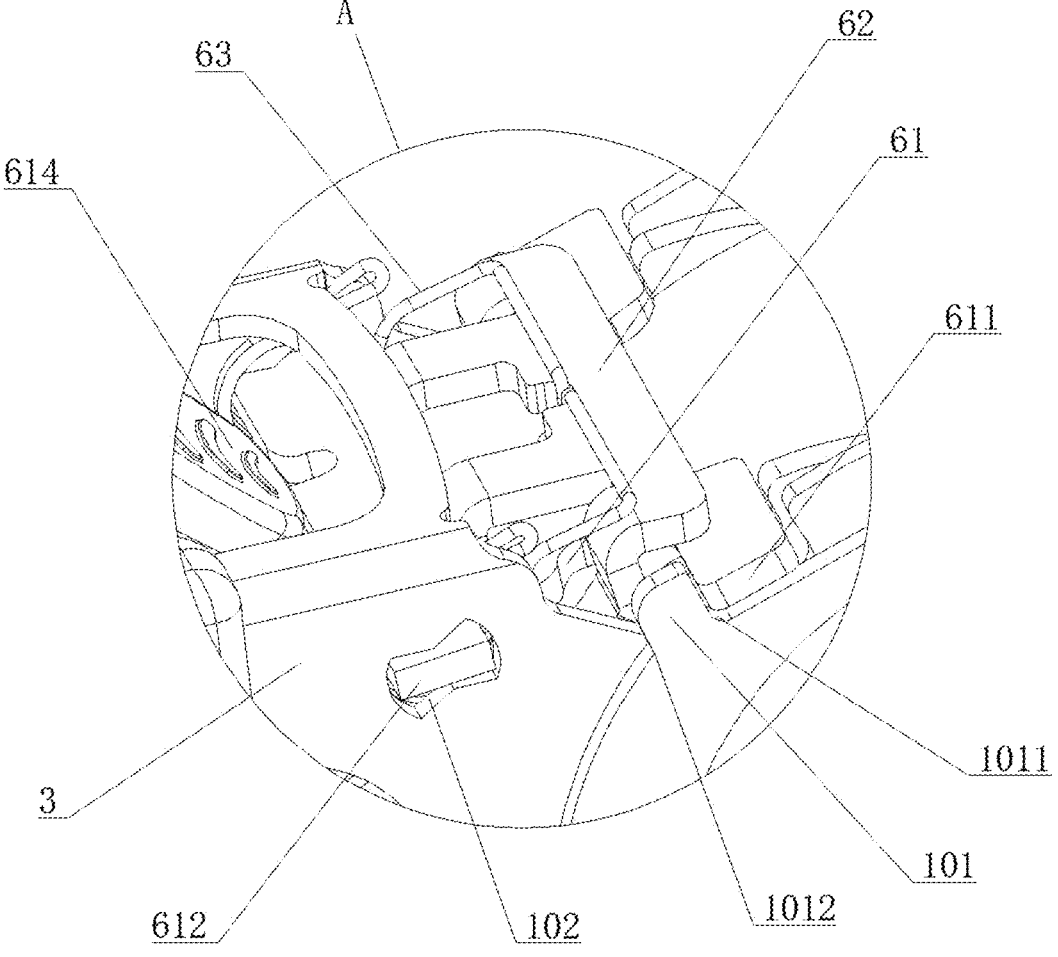
FIG. 2 is an enlarged view of part A in FIG. 1.
Figure 3:
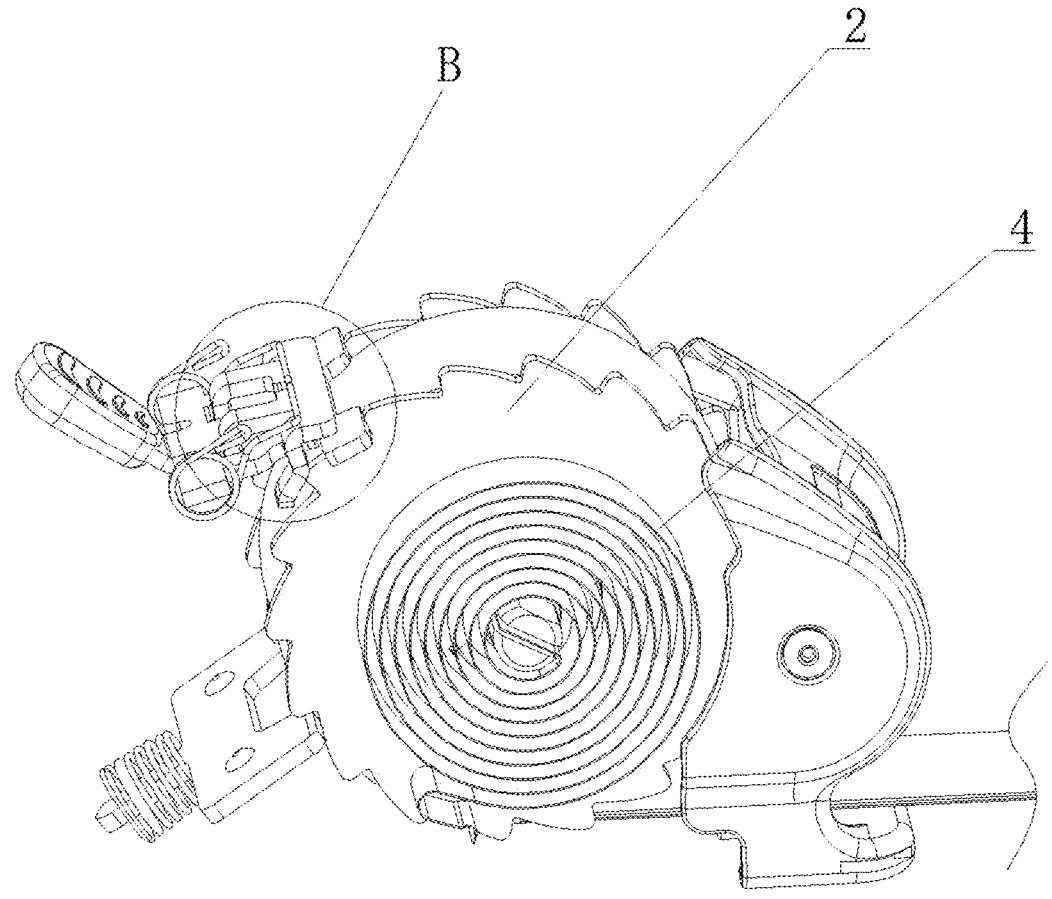
FIG. 3 is a schematic structural diagram of a handle holder in a locked position of an integrated brake structure of the present application.
Figure 4:
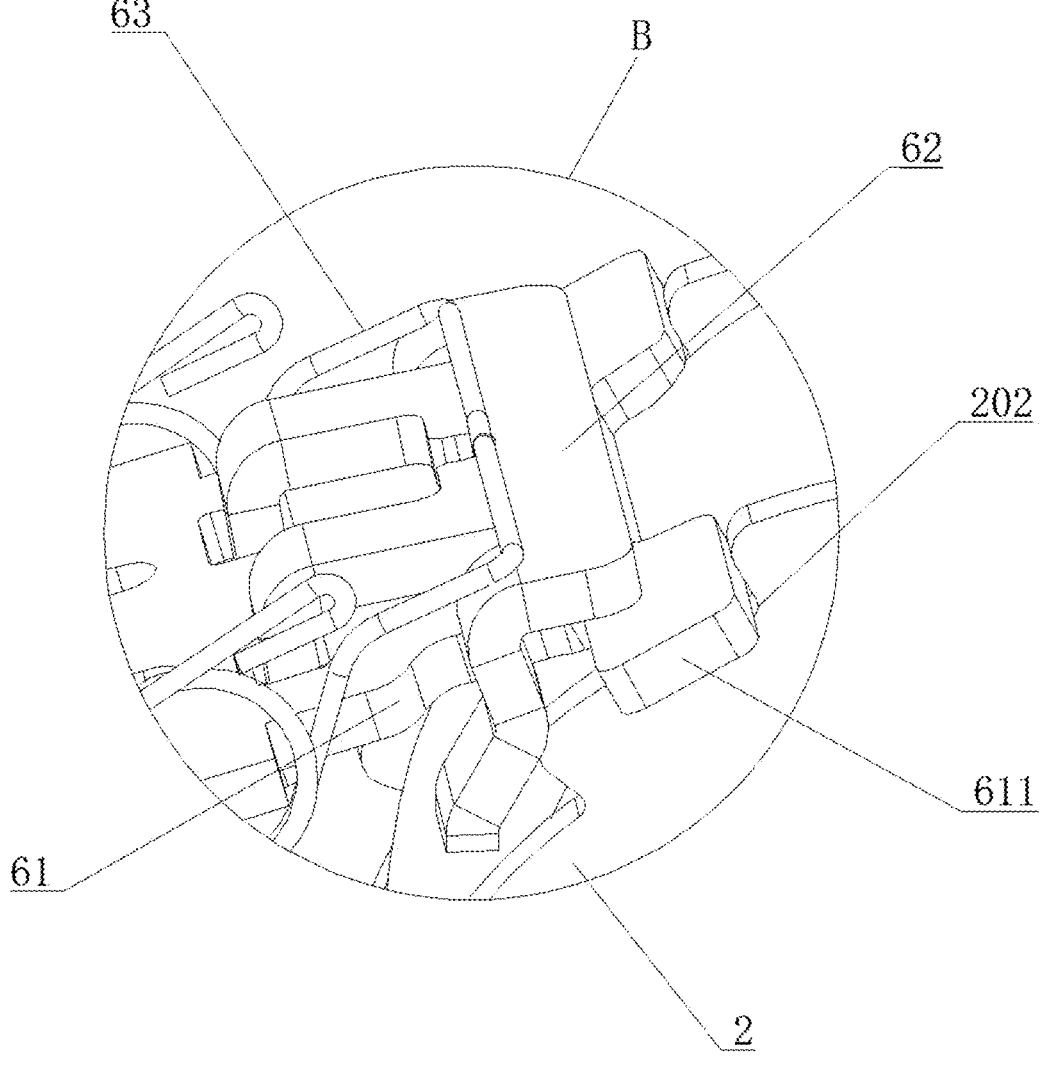
FIG. 4 is an enlarged view of part B in FIG. 3.
Figure 8:
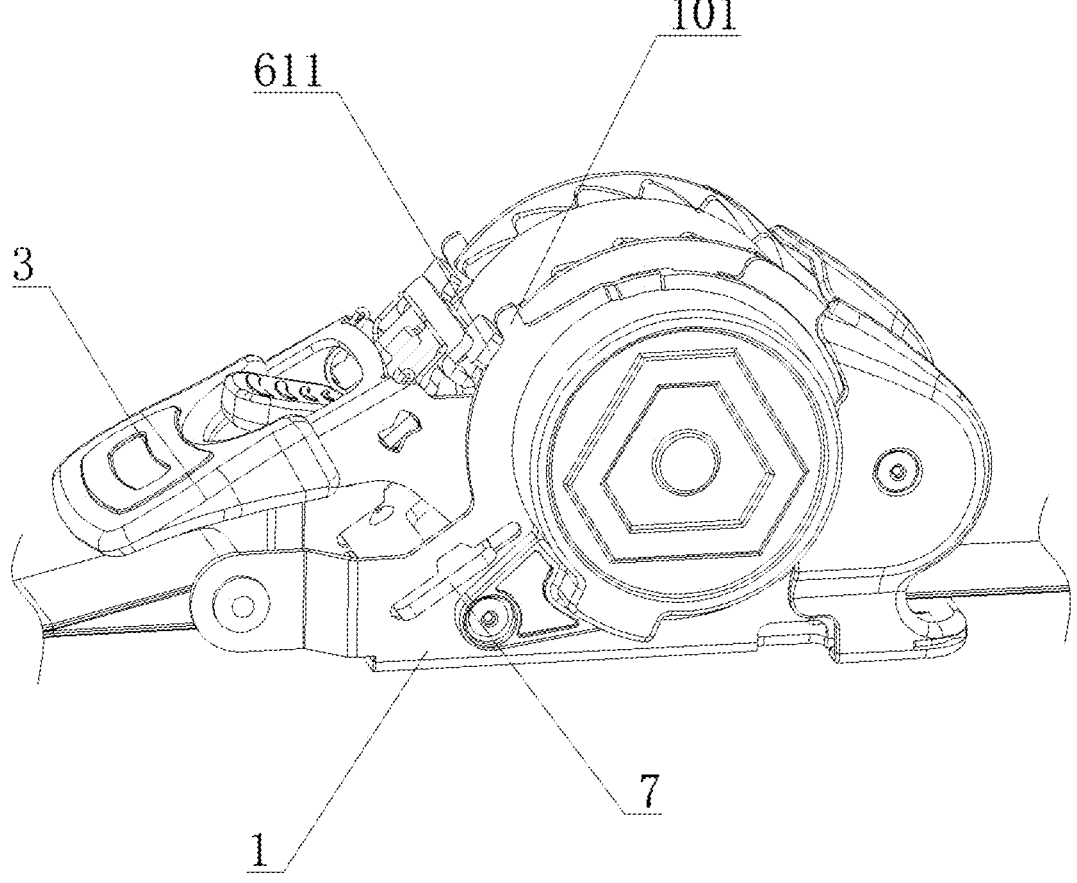
FIG. 8 is a three-dimensional diagram of a handle holder in an unlocked position of an integrated brake structure of the present application.
Figure 9:
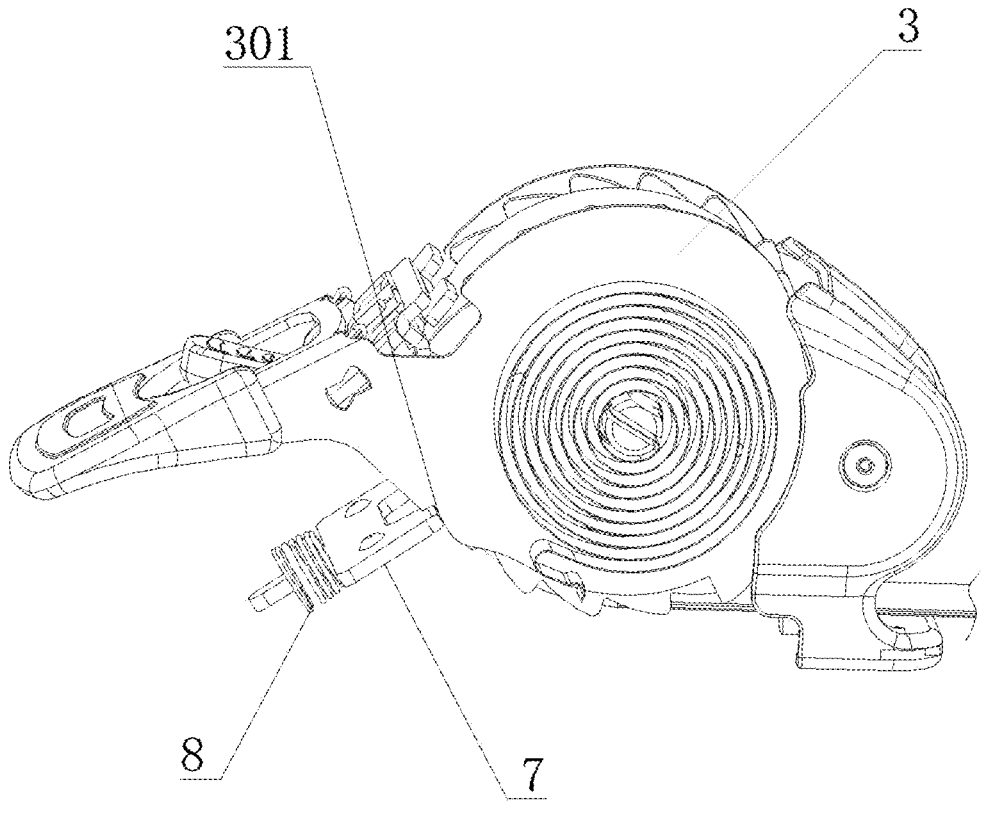
FIG. 9 is a schematic structural diagram of a pushing part of an integrated brake structure of the present application.
Figure 10:
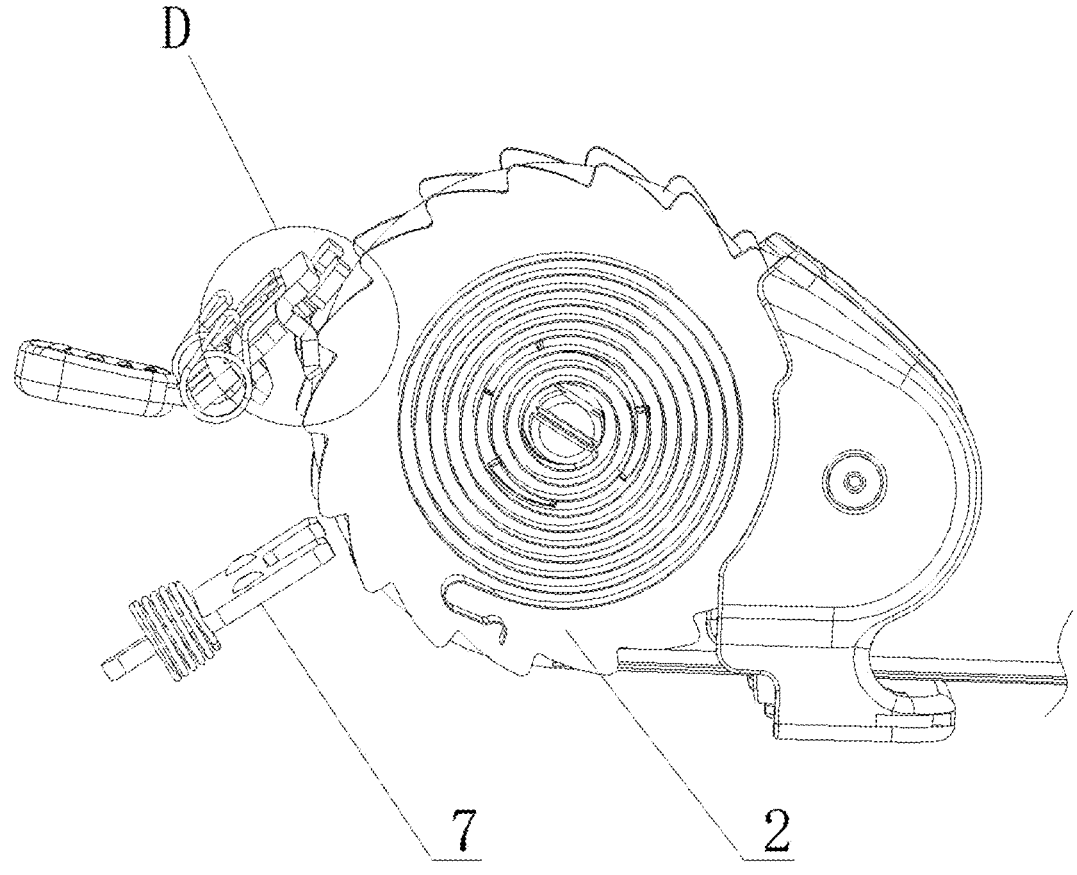
FIG. 10 is a schematic structural diagram of a handle holder in an unlocked position of an integrated brake structure of the present application.
Figure 11:
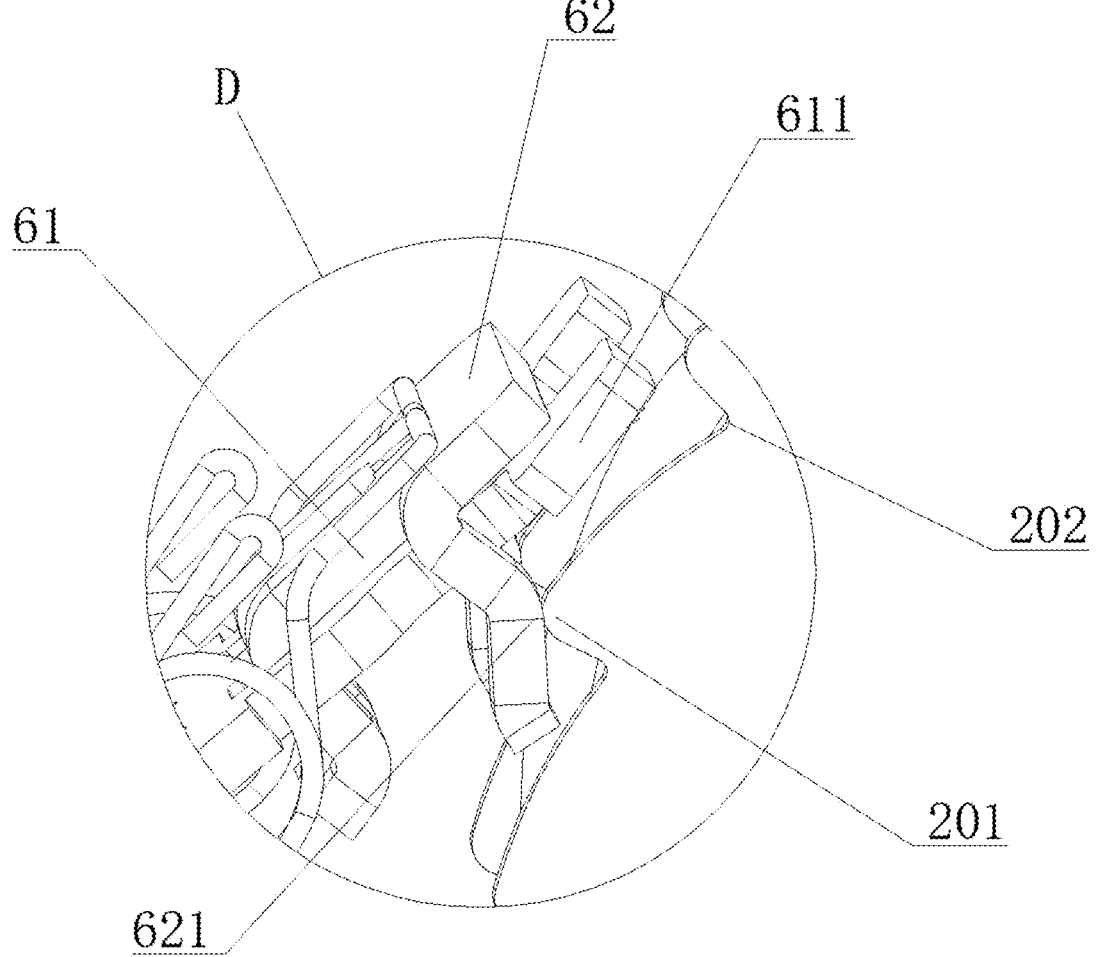
FIG. 11 is an enlarged view of part D in FIG. 10.

Referring to FIG. 1, FIG. 2, and FIG. 8, the housing 1 is provided with a stop block 101. Two sides of the stop block 101 are provided with a first stop part 1011 and a second stop part 1012 respectively. When the handle holder 3 is in the locked position, the positioning block 611 abuts against the first stop part 1011 for limiting the position. Therefore, in the locked state, the positioning block 611 can accurately and stably engages in the positioning groove 202, and the positioning block 611 is not likely to undergo displacement after engagement, thereby preventing the positioning block 611 from accidentally being out of the engaged and locked state with the positioning groove 202 and ensuring reliability in use. When the handle holder 3 is in the unlocked position, the positioning block 611 abuts against the second stop part 1012 for limiting the position. Therefore, the second stop part 1012 can stop the positioning block 611 from engaging in the positioning groove 202, and prevent the positioning block 611 from interfering with the ratchet wheel 2.

Referring to FIG. 1 and FIG. 2, the handle holder 3 is rotatably connected to the housing 1. The first brake pad 61 is rotatably connected to the handle holder 3. The first brake pad 61 is provided with a mounting block 612. A mounting groove 102 for rotatably mounting the mounting block 612 is formed in the housing 1. The mounting groove 102 includes two symmetrically formed fan-shaped grooves for limiting a rotation angle of the mounting block 612. By arranging the mounting block 612 of the first brake pad 61 in the mounting groove 102 of the housing 1, a stable rotation fulcrum is established for the entire brake pad assembly, and a swing angle of the first brake pad 61 is strictly limited within a physical range formed by the two symmetrical fan-shaped grooves, thereby preventing the first brake pad 61 from excessively rotating and affecting the locking function of the first brake pad 61 and the second brake pad 62, and ensuring reliability in use.

Referring to FIG. 1, FIG. 2, FIG. 5, and FIG. 7, the second brake pad 62 is provided with mounting bars 622, and the first brake pad 61 is provided with insertion grooves 613 for inserting the corresponding mounting bars 622. Therefore, the second brake pad 62 can be accurately mounted in a predetermined position and form an integral component with the first brake pad 61 for coordinated movement. Moreover, the second brake pad 62 can undergo a slight elastic displacement relative to the first brake pad 61 under the action of the elastic member 63, thereby achieving the semi-locked state of the ratchet wheel 2 by the second brake pad 62.

Referring to FIG. 1, FIG. 2, and FIG. 8, the first brake pad 61 is provided with a pressing handle 614. The second brake pad 62 is pressed against one side of the first brake pad 61 away from the ratchet wheel 2. The elastic member 63 is a torsion spring. Two legs of the torsion spring abut against the handle holder 3 and the first brake pad 61 respectively. The first brake pad 61 and the second brake pad 62 are driven to rotate by pressing down the pressing handle 614 with an external force. When the handle holder 3 needs to be switched from the locked position to the unlocked position, the pressing handle 614 is pressed down with an external force to disengage the positioning block 611 of the first brake pad 61 from the corresponding positioning groove 202, at which moment the pressing handle 614 is pressed down with the external force to the unlocked position. When the handle holder 3 is in the unlocked position, the second brake pad 62 can disengage from the ratchet wheel 2 by pressing down the pressing handle 614, at which moment the ratchet wheel 2 is in a fully unlocked state, and the ratchet wheel 2 rotate backward under the action of the coil spring 4 of the housing 1 to pre-tighten the first bandage 5. It should be noted that during a process that the first bandage 5 draws back, the pressing handle 614 is released in advance, at which moment the second brake pad 62 positions the ratchet wheel 2 in the semi-locked state again, and the pulled-out length of the first bandage 5 can be adjusted as required. After the first bandage 5 is pre-tightened, the pressing handle 614 is released and then the handle holder 3 is pushed up with an external force, at which moment the handle holder 3 drives the ratchet wheel 2 to rotate forward (i.e., the clockwise rotation direction of the ratchet wheel 2 in FIG. 10) via the first brake pad 61, so that the first bandage 5 further draws back and is tightened. Then, after the handle holder 3 is pressed down, the handle holder 3 is pushed up again so that the first bandage 5 further draws back and is tightened. The operation of pressing down and pushing up the handle holder 3 is performed again to fully tighten the first bandage 5 to facilitate use.

Figure 5:
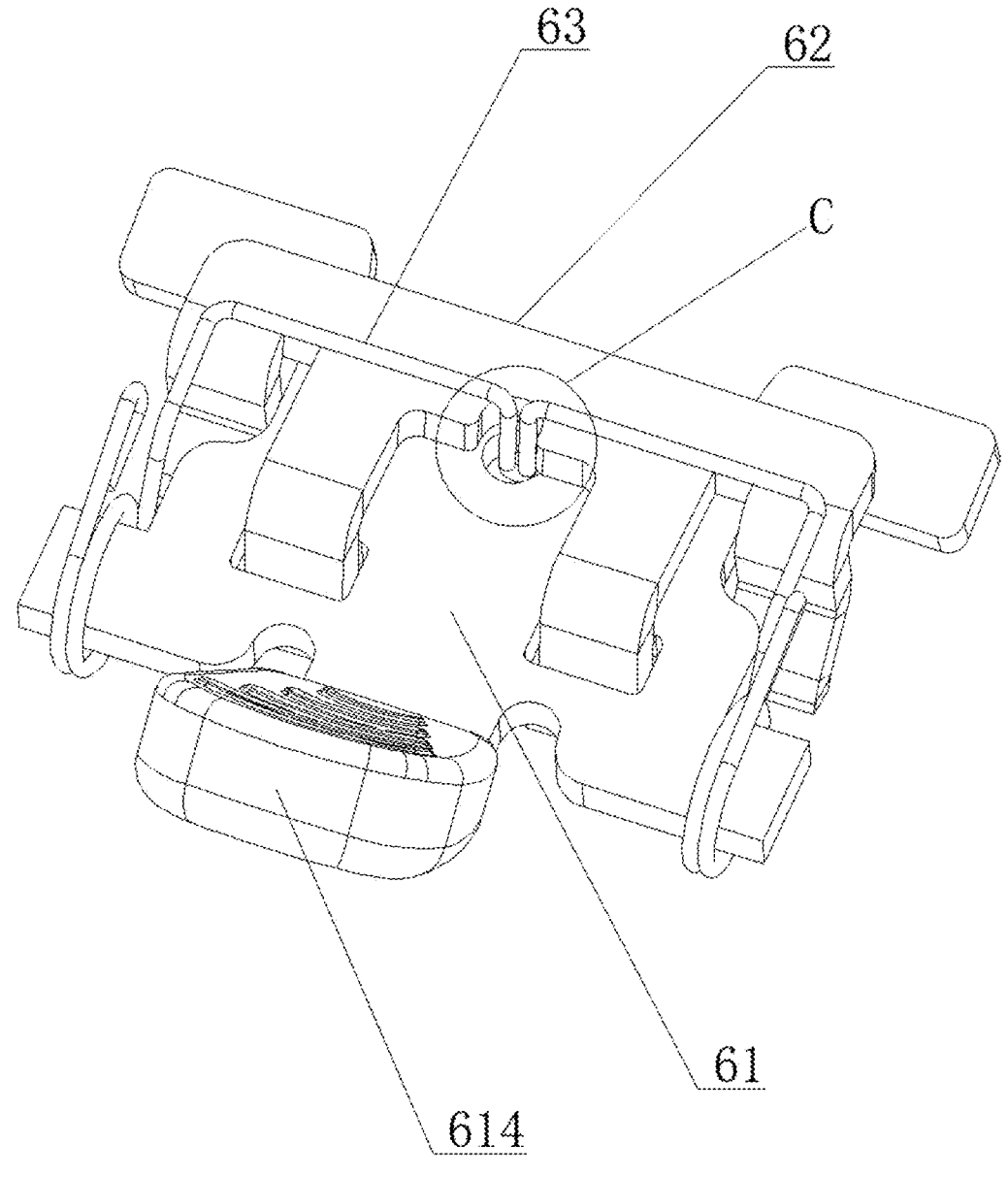
FIG. 5 is a schematic structural diagram of a brake pad assembly of an integrated brake structure of the present application.
Figure 6:
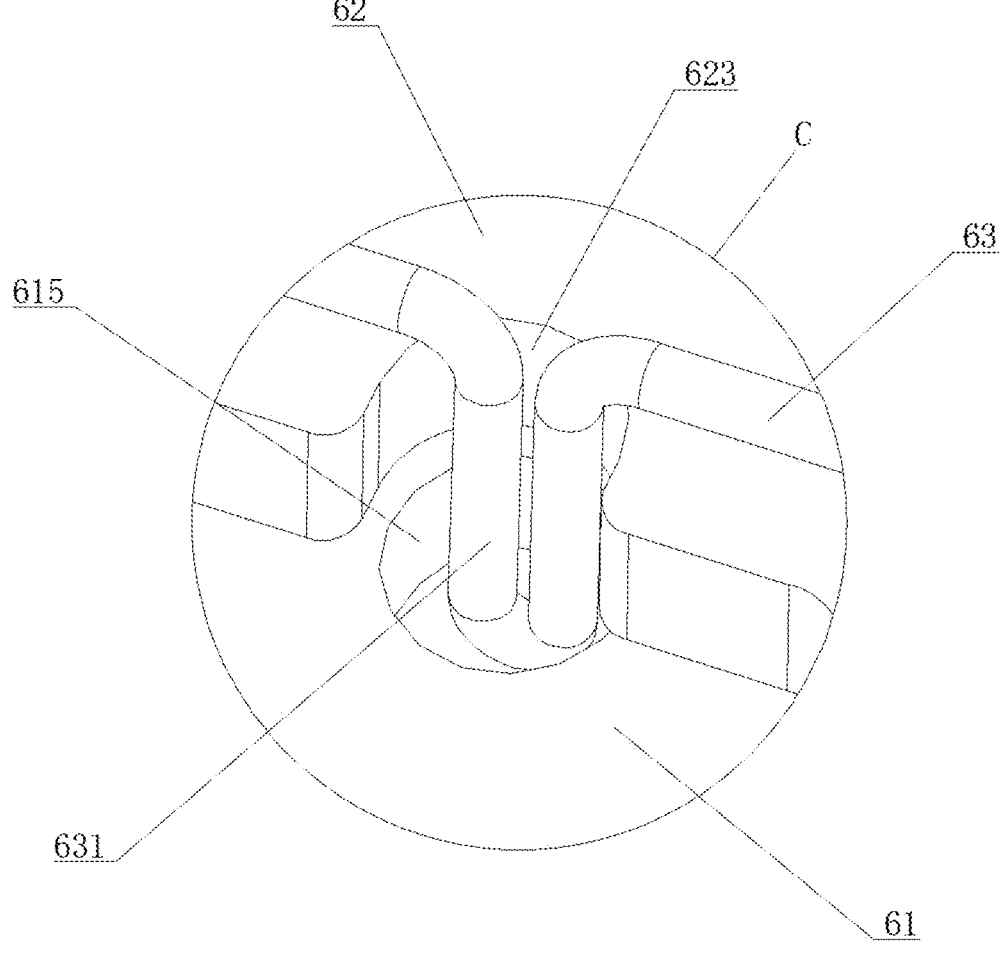
FIG. 6 is an enlarged view of part C in FIG. 5.
Figure 7:
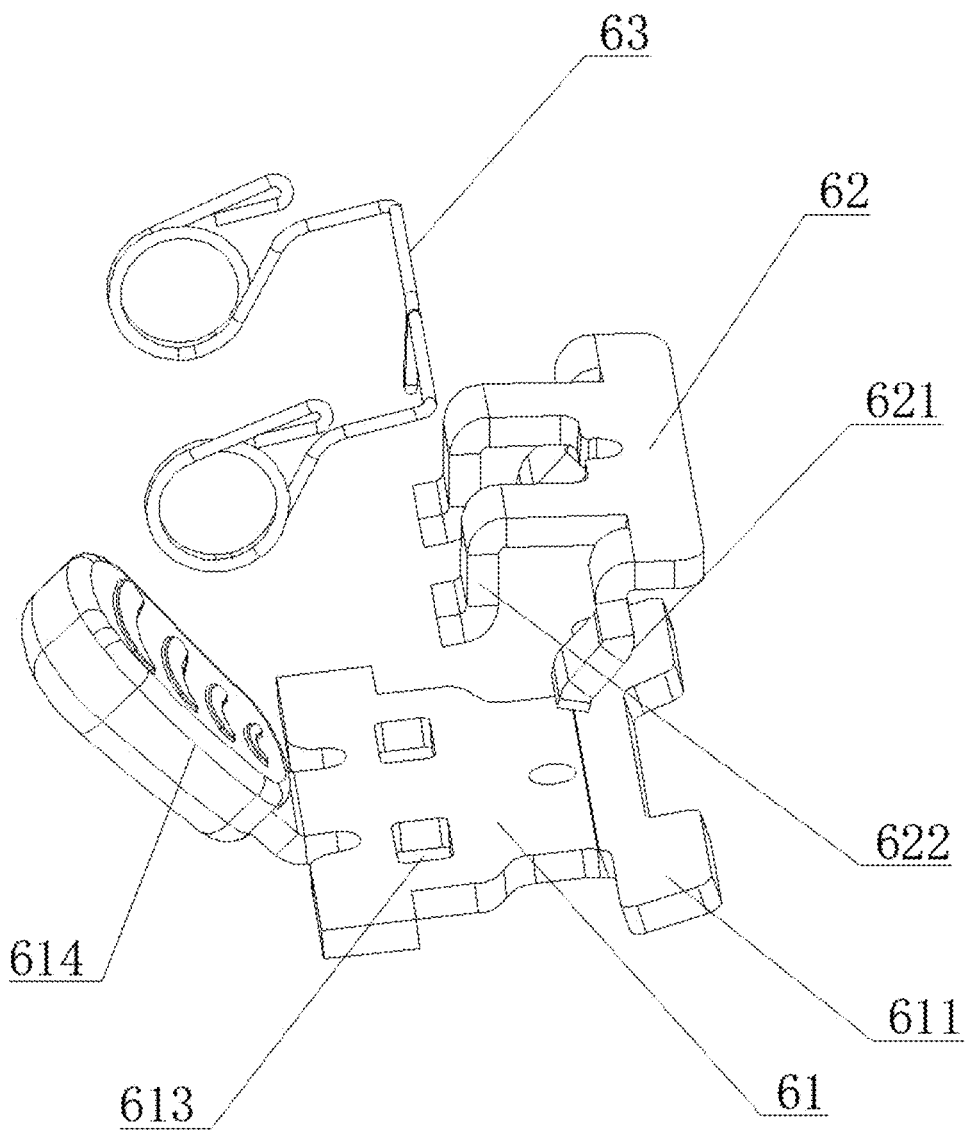
FIG. 7 is an exploded view of a brake pad assembly of an integrated brake structure of the present application.

Referring to FIG. 5 to FIG. 7, the torsion spring is provided with a limiting protrusion 631 in a bending manner. The first brake pad 61 is provided with a first limiting groove 615 corresponding to the limiting protrusion 631. The second brake pad 62 is provided with a second limiting groove 623 corresponding to the limiting protrusion 631. The limiting protrusion 631 is clamped in the first limiting groove 615 and the second limiting groove 623 simultaneously for limiting the position. The first limiting groove 615 and the second limiting groove 623 provide a fixed mounting position for the torsion spring, so that the torsion spring is less prone to displacement after being mounted. Also, after the limiting protrusion 631 is simultaneously clamped into the first limiting groove 615 and the second limiting groove 623, relative positions of the first brake pad 61 and the second brake pad 62 are limited. Therefore, the first brake pad 61 and the second brake pad 62 can move as a whole when driven by the torsion spring, while a desired small amount of movement margin can be provided for the second brake pad 62 to achieve a semi-locking function, thereby ensuring accuracy and reliability of the two brake pads in cooperation.

Referring to FIG. 1, the housing 1 is provided with a second bandage 9. One end of the first bandage 5 is provided with a first buckling ring 501. One end of the second bandage 9 is provided with a second buckling ring 901. The first buckling ring 501 and the second buckling ring 901 are convenient to form a complete binding loop, so that the tensioner 10 can be flexibly connected and tensioned between two securing points, to achieve convenient and efficient binding and securing of goods. The housing 1 is provided with a coil spring 4. The ratchet wheel 2 is driven by an elastic force of the coil spring 4 to rotate forward to draw back the first bandage 5. By providing the ratchet wheel 2 with continuous automatic rewinding power via the coil spring 4, the first bandage 5 can be quickly tightened and automatically draws back, thereby improving the operational efficiency.

Referring to FIG. 1, FIG. 3, FIG. 8, FIG. 9, and FIG. 10, the housing 1 is provided with a movable baffle plate 7. A compression spring 8 is arranged between the baffle plate 7 and the housing 1. The handle holder 3 is provided with a pushing part 301. When the handle holder 3 is in the locked position, the compression spring 8 drives the baffle plate 7 to abut against and lock the ratchet wheel 2. When the handle holder 3 is driven to move from the locked position to the unlocked position with an external force, the handle holder 3 pushes the baffle plate 7 via the pushing part 301 to disengage from the ratchet wheel 2. When the handle holder 3 is in the locked position, the baffle plate 7 automatically engages in a certain positioning groove 202 of the ratchet wheel 2 under the action of the compression spring 8, thereby providing an additional mechanical locking effect, and effectively preventing backward rotation of the ratchet wheel and loosening of the bandage caused by accidental failure or vibration of the first brake pad 61. When the handle holder 3 is to be unlocked, the pushing part 301 of the handle holder 3 may actively push away the baffle plate 7 to ensure smooth operation. In addition, when the handle holder 3 is in the locked position, the positioning block 611 and the positioning groove 202 are engaged to serve as a first force bearing point, and the baffle plate 7 abuts against and locks the ratchet wheel 2 under the action of the compression spring 8 to serve as a second force bearing point, thus forming a two-point supported force bearing system. A concentrated stress borne by a single component is effectively dispersed to two different structures, thereby reducing a load borne by each point, alleviating fatigue and wear of the components, improving the durability of key components such as the first brake pad 61 and the baffle plate 7, preventing deformation or early damage of the key components, enhancing the overall reliability of the tensioner 10 under heavy load and high-frequency use, and prolonging the service life of a product.

The integrated brake structure of the present application simplifies the structure and reduces the production and assembly costs by integrating the brake pad assembly with the handle holder into one unit. By driving the handle holder 3 to move with an external force, locking and unlocking functions are achieved: in the locked position, the first bandage 5 can be firmly restricted from drawing back, thereby ensuring securing of goods; and in the unlocked position, the ratchet wheel 2 can be in a semi-locked state, to allow the first bandage 5 to be pulled out in a controllable manner, thereby avoiding the risk of sudden loss of control and rebound of the first bandage 5 and improving operational safety. When the handle holder 3 is in the locked position, the positioning block 611 and the positioning groove 202 are engaged to serve as a first force bearing point, and the baffle plate 7 abuts against and locks the ratchet wheel 2 under the action of the compression spring 8 to serve as a second force bearing point, thus forming a two-point supported force bearing system. A concentrated stress borne by a single component is effectively dispersed to two different structures, thereby reducing a load borne by each point, alleviating fatigue and wear of the components, improving the durability of key components such as the first brake pad 61 and the baffle plate 7, preventing deformation or early damage of the key components, enhancing the overall reliability of the tensioner 10 under heavy load and high-frequency use, and prolonging the service life of a product.

In addition, the present application further provides a tensioner 10, which includes the aforementioned integrated brake structure. The tensioner 10 also has the beneficial effects of the aforementioned integrated brake structure, and descriptions thereof will not be repeated herein.

In the description of the present disclosure, it should be understood that, the terms such as "upper", "lower", "bottom", "inner", "outer", and "circumferential" indicate orientations or positional relationships based on the orientations or positional relationships shown in the accompanying drawings, and are merely intended to facilitate the description of the present disclosure and simplify the description, rather than to indicate or imply that an apparatus or element referred to has to have a specific orientation or be constructed and operated in the specific orientation, and therefore cannot be construed as a limitation on the present disclosure.

In addition, the terms such as "first" and "second" are used merely for the purpose of description, and shall not be construed as indicating or implying relative importance or implying the number of technical features indicated. Therefore, the features defined by "first", "second", and the like may explicitly indicate or implicitly include at least one of such features. In the description of the present disclosure, unless otherwise explicitly and specifically defined, "a plurality of" means at least two, for example, two or three.

In the present disclosure, unless otherwise explicitly specified and defined, the terms such as "mount" and "connect" should be understood in a generalized manner. For example, connection may be understood as fixed connection, detachable connection, or integration; or mechanical connection; or direct connection, or indirect connection by means of an intermediate medium; or internal communication between two elements; or an interaction relationship between two elements, unless otherwise explicitly specified. A person of ordinary skill in the art can understand specific meanings of the terms in the present disclosure based on specific situations.

The technical features in the above embodiments may be freely combined. For conciseness of description, not all possible combinations of the technical features in the above embodiments are described herein. However, the combinations of these technical features are considered to be within the scope as described in this specification without conflict among the combinations.

What is claimed is:

1. An integrated brake structure, comprising a housing (1), a ratchet wheel (2), a handle holder (3), and a brake pad assembly, wherein the ratchet wheel (2) is rotatably arranged on the housing (1), a first bandage (5) is wrapped around the ratchet wheel (2), the handle holder (3) is movably arranged on the housing (1) and has a locked position and an unlocked position during movement, the brake pad assembly comprises a first brake pad (61), a second brake pad (62), and an elastic member (63), the first brake pad (61) is connected to the handle holder (3), the second brake pad (62) is connected to the first brake pad (61); when the handle holder (3) is driven to the locked position with an external force, the elastic member (63) drives the first brake pad (61) to abut against and lock the ratchet wheel (2) to restrict the first bandage (5) from being pulled out by the external force; and when the handle holder (3) is driven to the unlocked position with the external force, the elastic member (63) drives the second brake pad (62) to abut against the ratchet wheel (2) and position the ratchet wheel (2) in a semi-locked state, at which moment the first bandage (5) can be pulled out by the external force;

wherein the first brake pad (61) is provided with a pressing handle (614), the second brake pad (62) is pressed against one side of the first brake pad (61) away from the ratchet wheel (2), the elastic member (63) is a torsion spring, and two legs of the torsion spring abut against the handle holder (3) and the first brake pad (61) respectively; and wherein the torsion spring is provided with a limiting protrusion (631) in a bending manner, the first brake pad (61) is provided with a first limiting groove (615) corresponding to the limiting protrusion (631), the second brake pad (62) is provided with a second limiting groove (623) corresponding to the limiting protrusion (631), and the limiting protrusion (631) is clamped in the first limiting groove (615) and the second limiting groove (623) simultaneously for limiting the position.

2. The integrated brake structure according to claim 1, wherein the ratchet wheel (2) is provided with a plurality of convex teeth (201) along a circumferential direction thereof, a positioning groove (202) is formed between two adjacent convex teeth (201), the first brake pad (61) is provided with a positioning block (611) movably engaged with the positioning groove (202), the second brake pad (62) is provided with an abutting block (621) movably abutted against the convex tooth (201); when the handle holder (3) is in the locked position, the elastic member (63) drives the positioning block (611) to engage with the positioning groove (202) to lock the ratchet wheel (2); and when the handle holder (3) is in the unlocked position, the positioning block (611) disengages from the positioning groove (202), and the elastic member (63) drives the abutting block (621) to abut against the convex tooth (201) to position the ratchet wheel (2) in the semi-locked state.

3. The integrated brake structure according to claim 2, wherein the housing (1) is provided with a stop block (101), two sides of the stop block (101) are provided with a first stop part (1011) and a second stop part (1012) respectively; when the handle holder (3) is in the locked position, the positioning block (611) abuts against the first stop part (1011) for limiting the position; and when the handle holder (3) is in the unlocked position, the positioning block (611) abuts against the second stop part (1012) for limiting the position.

4. The integrated brake structure according to claim 3, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

5. A tensioner, comprising the integrated brake structure according to claim 3.

6. The integrated brake structure according to claim 2, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

7. A tensioner, comprising the integrated brake structure according to claim 2.

8. The integrated brake structure according to claim 1, wherein the handle holder (3) is rotatably connected to the housing (1), the first brake pad (61) is rotatably connected to the handle holder (3), the first brake pad (61) is provided with a mounting block (612), a mounting groove (102) for rotatably mounting the mounting block (612) is formed in the housing (1), and the mounting groove (102) comprises two symmetrically formed fan-shaped grooves for limiting a rotation angle of the mounting block (612).

9. The integrated brake structure according to claim 8, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

10. A tensioner, comprising the integrated brake structure according to claim 8.

11. The integrated brake structure according to claim 1, wherein the second brake pad (62) is provided with mounting bars (622), and the first brake pad (61) is provided with insertion grooves (613) for inserting the corresponding mounting bars (622).

12. The integrated brake structure according to claim 11, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

13. The integrated brake structure according to claim 1, wherein the housing (1) is provided with a second bandage (9), one end of the first bandage (5) is provided with a first buckling ring (501), one end of the second bandage (9) is provided with a second buckling ring (901), the housing (1) is provided with a coil spring (4), and the ratchet wheel (2) is driven by an elastic force of the coil spring (4) to rotate forward to draw back the first bandage (5).

14. The integrated brake structure according to claim 13, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

15. The integrated brake structure according to claim 1, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

16. The integrated brake structure according to claim 1, wherein the housing (1) is provided with a baffle plate (7) in a movable manner, a compression spring (8) is arranged between the baffle plate (7) and the housing (1), the handle holder (3) is provided with a pushing part (301), when the handle holder (3) is in the locked position, the compression spring (8) drives the baffle plate (7) to abut against and lock the ratchet wheel (2); and when the handle holder (3) is driven to move from the locked position to the unlocked position with an external force, the handle holder (3) pushes the baffle plate (7) via the pushing part (301) to disengage from the ratchet wheel (2).

17. A tensioner, comprising the integrated brake structure according to claim 1.

* * * * *